United States Patent
Patel et al.

(10) Patent No.: US 12,339,994 B2
(45) Date of Patent: Jun. 24, 2025

(54) SYSTEM AND METHOD FOR MANAGING ACCESS CONTROL OF SENSITIVE DATA

(71) Applicant: Dell Products L.P., Round Rock, TX (US)

(72) Inventors: Dharmesh M. Patel, Round Rock, TX (US); Prem Pradeep Motgi, Austin, TX (US); Manpreet Singh Sokhi, Santa Clara, CA (US)

(73) Assignee: Dell Products L.P., Round Rock, TX (US)

( * ) Notice: Subject to any disclaimer, the term of this patent is extended or adjusted under 35 U.S.C. 154(b) by 321 days.

(21) Appl. No.: 18/308,375

(22) Filed: Apr. 27, 2023

(65) Prior Publication Data
US 2024/0362358 A1    Oct. 31, 2024

(51) Int. Cl.
G06F 21/62    (2013.01)

(52) U.S. Cl.
CPC .................. G06F 21/6245 (2013.01)

(58) Field of Classification Search
CPC ................................... G06F 21/6245
USPC .......................................... 726/28
See application file for complete search history.

(56) References Cited

U.S. PATENT DOCUMENTS

| | | |
|---|---|---|
| 6,606,620 B1 | 8/2003 | Sundaresan |
| 8,117,235 B1 | 2/2012 | Barta |
| 8,255,948 B1 | 8/2012 | Black et al. |
| 8,495,720 B2 | 7/2013 | Counterman |
| 9,361,428 B2 | 6/2016 | Bessette |
| 9,571,890 B1 | 2/2017 | Diamondstein |
| 9,781,097 B2 | 10/2017 | Grajek et al. |
| 10,042,993 B2 | 8/2018 | Beigi |
| 10,073,948 B2 | 9/2018 | Cohen et al. |
| 10,157,275 B1 | 12/2018 | Venkatasamy et al. |
| 10,170,203 B1 * | 1/2019 | Blechman .............. G06Q 10/10 |
| 10,462,142 B2 | 10/2019 | Pattar et al. |

(Continued)

FOREIGN PATENT DOCUMENTS

| | | |
|---|---|---|
| CN | 202058147 U | 11/2011 |
| CN | 115292285 A | 11/2022 |

(Continued)

OTHER PUBLICATIONS

Page, Sébastien, "How to move your Health data from one iPhone to another," iDB, Web Page <https://www.downloadblog.com/2016/10/13/health-data-importer-makes-moving-your-health-data-from-one-iphone-to-another-a-breeze/> accessed on Oct. 30, 2022 (9 Pages).

(Continued)

*Primary Examiner* — Tan Doan
(74) *Attorney, Agent, or Firm* — WOMBLE BOND DICKINSON (US) LLP

(57) ABSTRACT

Methods and systems for managing access and control of data are disclosed. To manage access and control, data management system may require registration and verification of devices associated with an individual or other individuals to which control over access may be granted. Data management system may vest control over access to data to the device associated with the individual for which data is stored and progressively vest control over access to data to other devices associated with other individuals as an increasing amount of information indicating the lack of capacity of the individual to authorize access to data.

20 Claims, 9 Drawing Sheets

(56) References Cited

U.S. PATENT DOCUMENTS

| | | |
|---|---|---|
| 10,701,056 B2 | 6/2020 | Murthy |
| 10,904,237 B2 | 1/2021 | Murthy et al. |
| 11,010,392 B1 | 5/2021 | Hirsch et al. |
| 11,094,402 B2 | 8/2021 | Brown et al. |
| 11,217,331 B2 | 1/2022 | Vishnubhatla et al. |
| 11,405,189 B1 | 8/2022 | Bennison |
| 11,631,401 B1 | 4/2023 | Nudd |
| 11,763,821 B1 | 9/2023 | McNair |
| 11,849,069 B1 | 12/2023 | Can |
| 12,135,708 B2 | 11/2024 | Chermside |
| 2003/0046401 A1 | 3/2003 | Abbott |
| 2005/0160166 A1 | 7/2005 | Kraenzel |
| 2008/0154961 A1 | 6/2008 | Dougall |
| 2008/0275701 A1 | 11/2008 | Wu et al. |
| 2009/0171692 A1 | 7/2009 | Zilberman et al. |
| 2010/0169304 A1 | 7/2010 | Hendricksen et al. |
| 2011/0131174 A1 | 6/2011 | Birch et al. |
| 2012/0265771 A1 | 10/2012 | Suh |
| 2014/0181673 A1 | 6/2014 | Work |
| 2014/0201199 A1 | 7/2014 | Hajaj |
| 2014/0207885 A1 | 7/2014 | Baker et al. |
| 2014/0344288 A1 | 11/2014 | Evans |
| 2015/0169574 A1 | 6/2015 | Bau et al. |
| 2015/0199268 A1 | 7/2015 | Davis et al. |
| 2015/0356127 A1 | 12/2015 | Pierre et al. |
| 2016/0006839 A1 | 1/2016 | Sawazaki |
| 2016/0164813 A1 | 6/2016 | Anderson |
| 2016/0231928 A1 | 8/2016 | Lewis et al. |
| 2016/0232159 A1 | 8/2016 | Parikh |
| 2016/0306812 A1 | 10/2016 | McHenry et al. |
| 2017/0013047 A1 | 1/2017 | Hubbard |
| 2017/0068784 A1* | 3/2017 | Sullivan ............... G16H 10/60 |
| 2017/0262164 A1 | 9/2017 | Jain |
| 2017/0365101 A1 | 12/2017 | Samec et al. |
| 2018/0121502 A1 | 5/2018 | Prieur |
| 2018/0189352 A1 | 7/2018 | Ghafourifar |
| 2018/0203612 A1 | 7/2018 | Kats et al. |
| 2019/0012931 A1 | 1/2019 | Candelore |
| 2019/0279744 A1 | 9/2019 | Howley et al. |
| 2019/0297035 A1 | 9/2019 | Fox et al. |
| 2019/0325036 A1 | 10/2019 | Edge |
| 2020/0110882 A1 | 4/2020 | Ripolles Mateu et al. |
| 2020/0226216 A1 | 7/2020 | Marin et al. |
| 2020/0258516 A1 | 8/2020 | Khaleghi |
| 2020/0364358 A1* | 11/2020 | Karia ............... G06F 21/6218 |
| 2021/0056131 A1 | 2/2021 | Ackermann et al. |
| 2021/0065203 A1 | 3/2021 | Billigmeier et al. |
| 2021/0256534 A1 | 8/2021 | An |
| 2021/0390196 A1 | 12/2021 | Lavine et al. |
| 2022/0261152 A1 | 8/2022 | Jude et al. |
| 2022/0293087 A1 | 9/2022 | Kumar |
| 2022/0334719 A1 | 10/2022 | Thrane |
| 2022/0366131 A1 | 11/2022 | Ekron |
| 2023/0061725 A1 | 3/2023 | Khan |
| 2023/0068099 A1 | 3/2023 | Abramenko et al. |
| 2023/0137931 A1 | 5/2023 | Song |
| 2023/0221911 A1 | 7/2023 | Bandameedipalli |

FOREIGN PATENT DOCUMENTS

| | | |
|---|---|---|
| JP | 4808173 B2 | 11/2011 |
| JP | 2015-106406 A | 6/2015 |
| WO | 2023/220948 A1 | 11/2023 |

OTHER PUBLICATIONS

"MyChart," Web Page <https://www.mychart.org/> accessed on Oct. 30, 2022 (6 Pages).

Xu, Jie, et al., "Federated learning for healthcare informatics," Journal of Healthcare Informatics Research 5 (2021): 1-19. (19 Pages).

Naz, Sadaf, et al., "A comprehensive review of federated learning for COVID-19 detection," International Journal of Intelligent Systems 37.3 (2022): 2371-2392. (22 Pages).

Prasser, Fabian, et al., "Efficient and effective pruning strategies for health data de-identification," BMC medical Informatics and decision making 16.1 (2016): 1-14. (14 Pages).

"FollowMyHealth®," Allscripts Healthcare Solutions Inc, Google Play Store, Web Page <https://play.google.com/store/apps/details?id=com.jardogs.fmhmobile&hl=en_US&gl=US> accesed on Jan. 8, 2023 (4 Pages).

Balaskas, Georgios, et al., "An end-to-end system for transcription, translation, and summarization to support the co-creation process. A Health Cascade Study", ACM Petra '23, published Aug. 10, 2023, pp. 625-631. (Year: 2023) (7 Pages).

D. Fedasyuk and I. Lutsyk, "Tools for adaptation of a mobile application to the needs of users with cognitive impairments," 2021 IEEE 16th International Conference on Computer Sciences and Information Technologies (CSIT), Lviv, Ukraine, 2021, pp. 321-324, doi: 10.1109/CSIT52700.2021.9648702. (Year: 2021).

* cited by examiner

SYSTEM AND METHOD FOR MANAGING ACCESS CONTROL OF SENSITIVE DATA

FIELD

Embodiments disclosed herein relate generally to data access and control. More particularly, embodiments disclosed herein relate to systems and methods to manage access and control of sensitive data.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
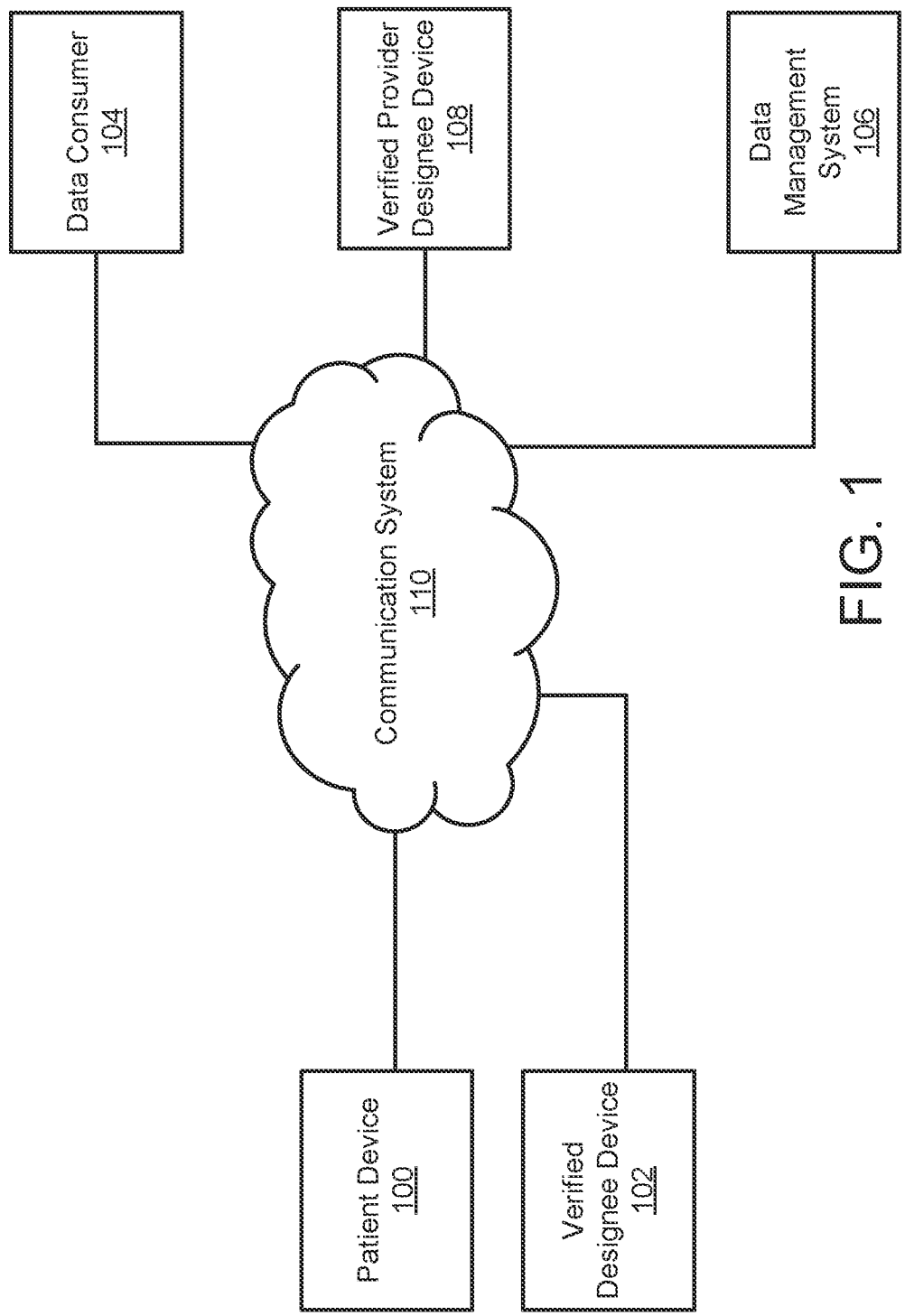
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing access and control of data. The data may be usable, for example, by (i) an individual for which the data is regarding, and (ii) other individuals to assist the individual. For example, the data may include medical information for an individual and the data may be usable by other individuals such as healthcare providers to diagnose and/or treat the individual for various medical conditions.

The system may include a data management system. The data may be stored in the data management system and accessed by an individual or other individuals (via associated devices) that are allowed access as permitted by the individual for which the data is stored. While providing access to the data may be beneficial for assisting the individual, for example, by providing accurate information for healthcare treatments, it may introduce potential risks to the individual such as unintentional disclosure of the data to other individuals.

To manage access and control of the data, the data management system may vest control over access to the data in the individual for which the data is stored (e.g., the individual most likely to suffer harm from inadvertent disclosure of the data), and progressively vest control over access to the data in other individuals (designed by the individual) as an increasing amount of information indicating the lack of capacity of the individual to authorize access.

To assign control over the access to the data, the data management system may require registration and verification of devices associated with the individual or others to which control over access may be granted. The individual for which the data is stored may provide a designation of the other individuals (e.g., associated devices) that may potentially receive control over access to the data to the data management system. The designation of the other individuals may include an assignment of each individual's level of authority to control access to the data.

Access control technology may improve the management of privately held health information by vesting control decisions based on the potential undesirable impact to the individual if the data were to be inadvertently disclosed.

In an embodiment, a method for managing access to privately held health information is disclosed. The method may include obtaining a request for medical data for a patient, the medical data being part of the privately held health information; in response to obtaining the request: identifying a patient device that is designated by the patient; performing a first consent resolution action with the patient device to attempt to gain a first authorization to disclose the medical data; in a first instance of the first consent resolution action where the first authorization to disclose the medical data was not obtained: identifying a verified designee device that is designated by the patient; performing a second consent resolution action with the verified designee device to attempt to gain a second authorization to disclose the medical data; in a first instance of the second consent resolution action where the second authorization to disclose the medical data was not obtained: identifying a verified provider designee device that is designated by the patient; performing a third consent resolution action with the verified provider designee device to attempt to gain a third authorization to disclose the medical data; and in a first instance of the third consent resolution action where the third authorization to disclose the medical data was not obtained: denying access to the medical data to service the request; and in a second instance of the third consent resolution action where the third authorization to disclose the medical data was obtained: providing the medical data to service the request.

Performing the third consent resolution action may include requesting the third authorization to disclose the medical data, the request being made to the verified provider designee device; obtaining a first response indicating whether the third authorization is partially granted by the verified provider designee device; in an instance of the first response where the third authorization is partially granted by the verified provider designee device: identifying a second provider designee device designated by the verified provider designee device; obtaining a second response indicating whether the third authorization is also partially granted by the second provider designee device; and determining whether the third authorization to disclose the medical data has been granted based on the first response and the second response.

The verified provider designee device may be associated with a primary care physician for the patient, and the second provider designee device is associated with another professional that provides care to the patient.

Performing the first consent resolution action may include requesting the first authorization to disclose the medical data, the request being made to the patient device; obtaining a third response indicating whether the first authorization is granted by the patient device; and determining whether the first authorization to disclose the medical data has been granted based on the third response.

Performing the second consent resolution action may include requesting the second authorization to disclose the medical data, the request being made to the verified designee device; obtaining a fourth response indicating whether the second authorization is granted by the verified designee device; and determining whether the second authorization to disclose the medical data has been granted based on the fourth response.

In a second instance of the first consent resolution action where the first authorization to disclose the medical data was obtained: providing the medical data to service the request.

In a second instance of the second consent resolution action where the second authorization to disclose the medical data was obtained: providing the medical data to service the request.

The privately held health information may be stored in a private data management system.

The request for medical data may be obtained from a data consumer system, the data consumer system providing data management services for a healthcare service provider that provides healthcare services for the patient, and the private data management system not being operated for the healthcare service provider.

The method may include identifying, based on the request, a potential condition that may be afflicting the patient; and identifying, based on the potential condition, at least one portion of data managed by the data management system that is usable in part for diagnosis of the potential condition.

Identifying the at least one portion of the data may include performing a look up using a type of the potential condition as a key to obtain an identifier for the at least one portion of the data. The data may be stored in a searchable format keyed to different types of potential conditions.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer-implemented services may include data management services, data storage services, data access and control services, database services, and/or any other type of service that may be implemented with a computing device.

To provide the computer implemented services, data may be stored in data management system 106. The data stored in data management system 106 may include data usable (i) by an individual for which the data is stored, and (ii) data usable by other individuals to assist the individual.

For example, an individual may store medical information in management system 106. While useful for the individual, the medical information may also be useful for others such as healthcare providers which may use the medical information to treat the patient. Thus, data stored in data management system 106 may be useful for the individual for which the data is stored and for others which may be assisting the individuals.

However, the data stored in data management system 106 on behalf of the individual may also present risk to the individual if inadvertently disclosed to some individuals. For example, malicious individuals may use inadvertently disclosed data for their own benefit and at the expense of the individual.

In general, embodiments disclosed herein may provide methods, systems, and/or devices for managing access and control of data. Access to and control of the data may be implemented using an access control framework that attempts to balance the risks associated with providing access to data held on behalf of an individual against the benefits provided by enabling access to the data. The access control framework may balance these risks by (i) substantially vesting control over access to the data in the individual for which the data is stored, and (ii) progressively vesting control over access to the data in others as progressively larger amounts of information indicating that it is in the individual's interest to vest control over access to the data in the others.

For example, absent any information indicating a lack of capacity of the individual to grant access to the data in other, all control over access to the data may be vested in the individual. However, as progressively more information indicating the lack of capacity of the individual to grant access to the data is obtained, control over access to the data may be granted, at least in part, to progressively larger numbers of individuals.

To limit risk of inadvertently disclosures of data, the access control framework may also require that particular devices associated with the individuals to which control over access to the data may be granted be designated by (i) the individual, or (ii) other individuals for which devices have already been designated. For example, personal electronic devices such as cell phones may be designated for different individuals for which control of the data may be granted. These designated devices may be used by the framework to gather information indicating the capacity of the individual to grant access to the data, as well as likely benefit conferred to the individual for granting of control in the data to these other individuals.

By implementing an access control framework, as discussed above, a system in accordance with embodiments disclosed herein may balance risk associated with inadvertent disclosures of data against the benefits provided by retaining the data for potential disclosure.

To provide the above noted functionality, the system of FIG. 1 may include patient device 100, verified designee device 102, data consumer 104, verified provider designee device 108, and communication system 110. Each of these components is discussed below.

Figure 2A:
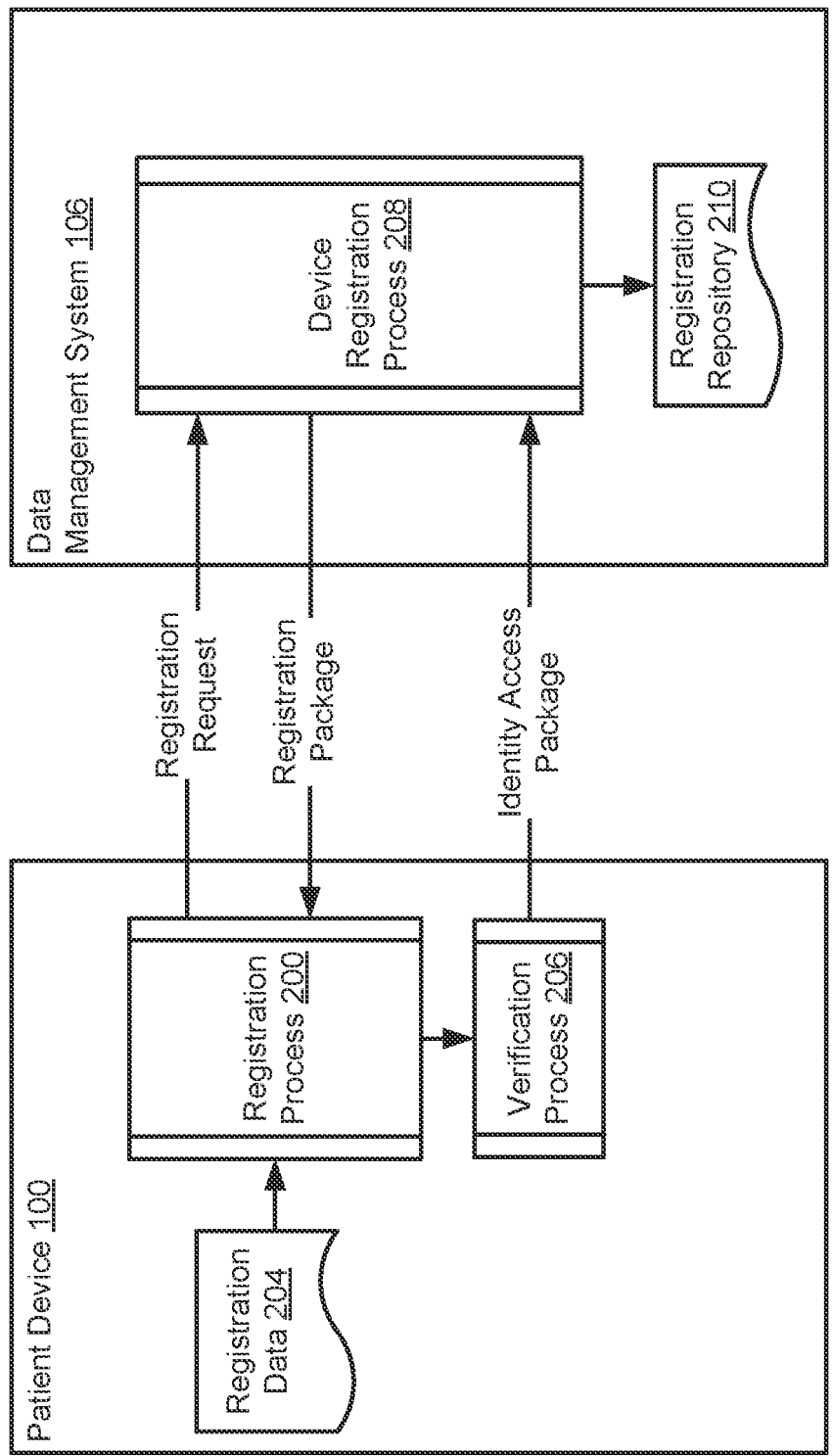
FIGS. 2A-2D show diagrams illustrating data flows in accordance with an embodiment.
Figure 2B:
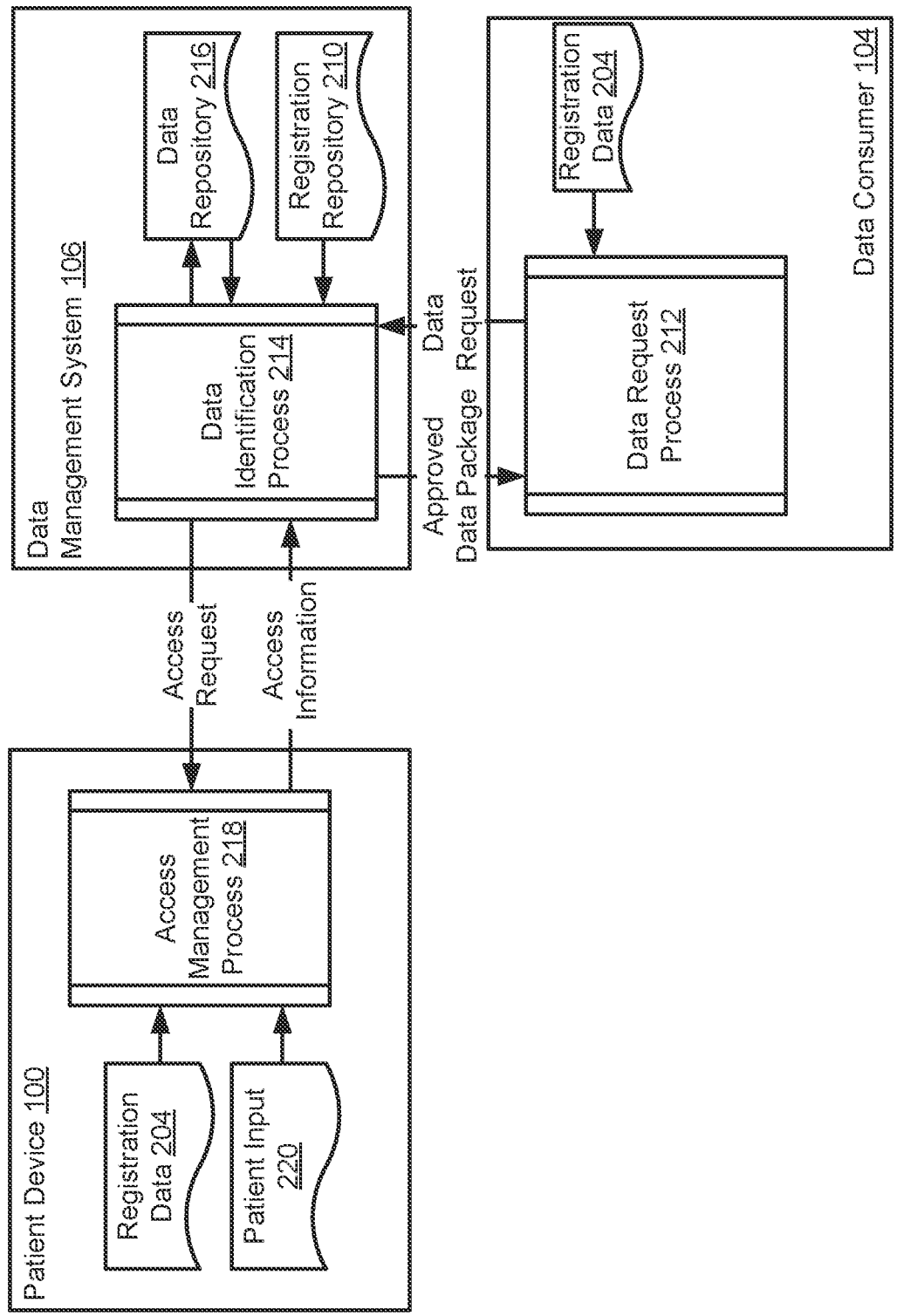

Patient device 100 may facilitate (i) control over data stored in data management system 106 by an individual, (ii) collection of information indicative of the capacity of the individual to manage access to the data stored in data management system 106, (iii) designation of individuals and associated devices (e.g., 102, 108) with potential access control rights in the data stored in data management system 106 (e.g., when the individual is likely unable to grant access to the data), and/or (iv) performance of other management operations. Patient device 100 may be registered with data management system 106. Refer to FIG. 2A for additional details regarding registration of patient device 100. Refer to FIG. 2B for additional details regarding managing control over data stored in data management system 106.

Patient device 100 may be implemented using, for example, a personal electronic device (e.g., a cell phone, a tablet computer, etc.), a desktop computer, and/or other types of devices that may be operated or used by a patient.

Figure 2C:
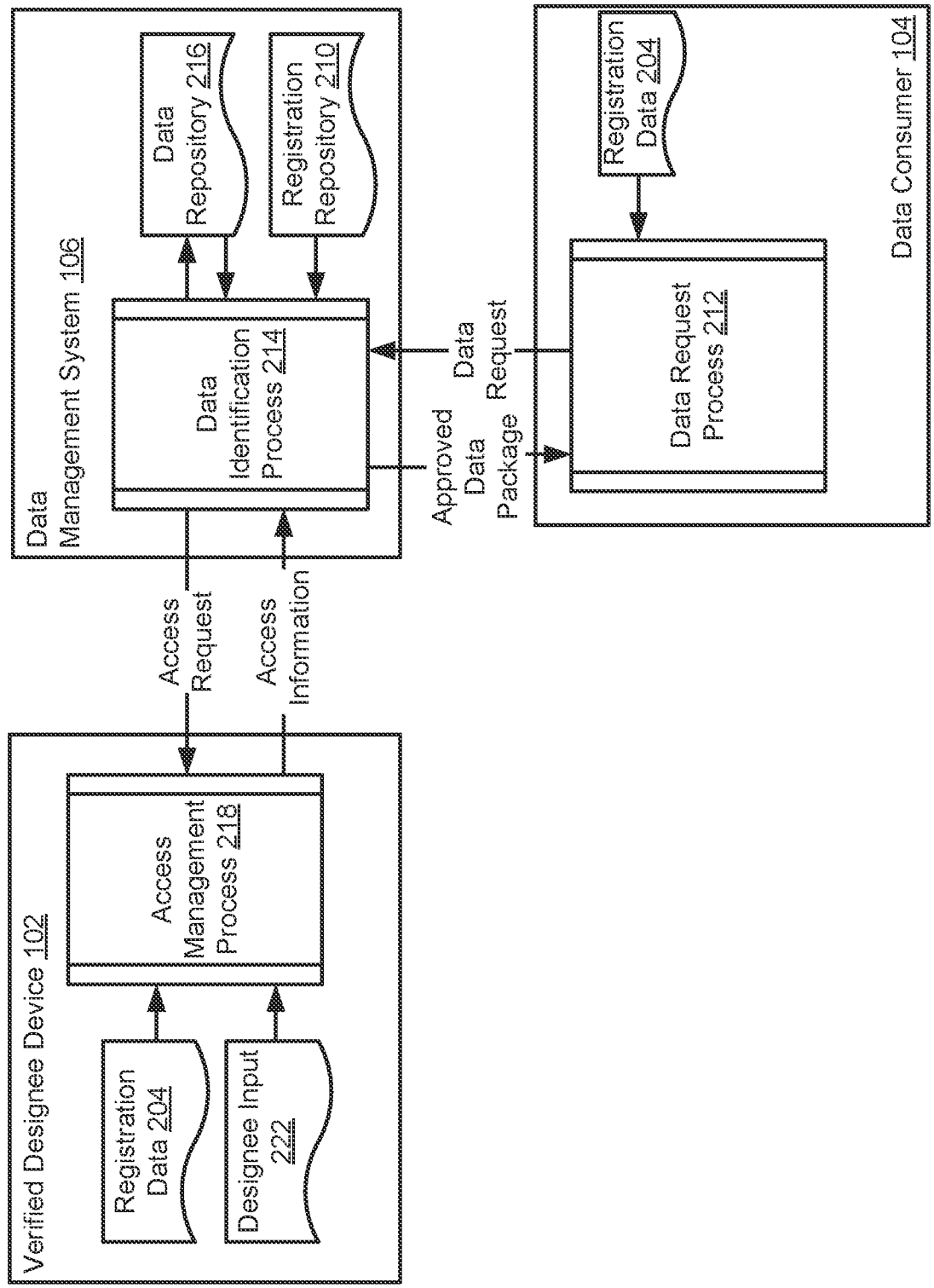

Verified designee device 102 may facilitate (i) access to and control over data stored in data management system 106 when patient device 100 is unable to grant access to the data, (ii) collection of information indicative of the capacity of the individual to manage access to the data stored in data management system 106, and/or (iii) performance of other management operations. Verified designee device 102 may be registered with data management system 106. Refer to FIG. 2A for additional details regarding registration of verified designee device 102. Refer to FIG. 2C for additional details regarding managing control over data stored in data management system 106.

Verified designee device 102 may implemented using, a personal electronic device, a desktop computer, and/or other types of devices that may be operated or used by a verified individual designated by the patient.

Figure 2D:
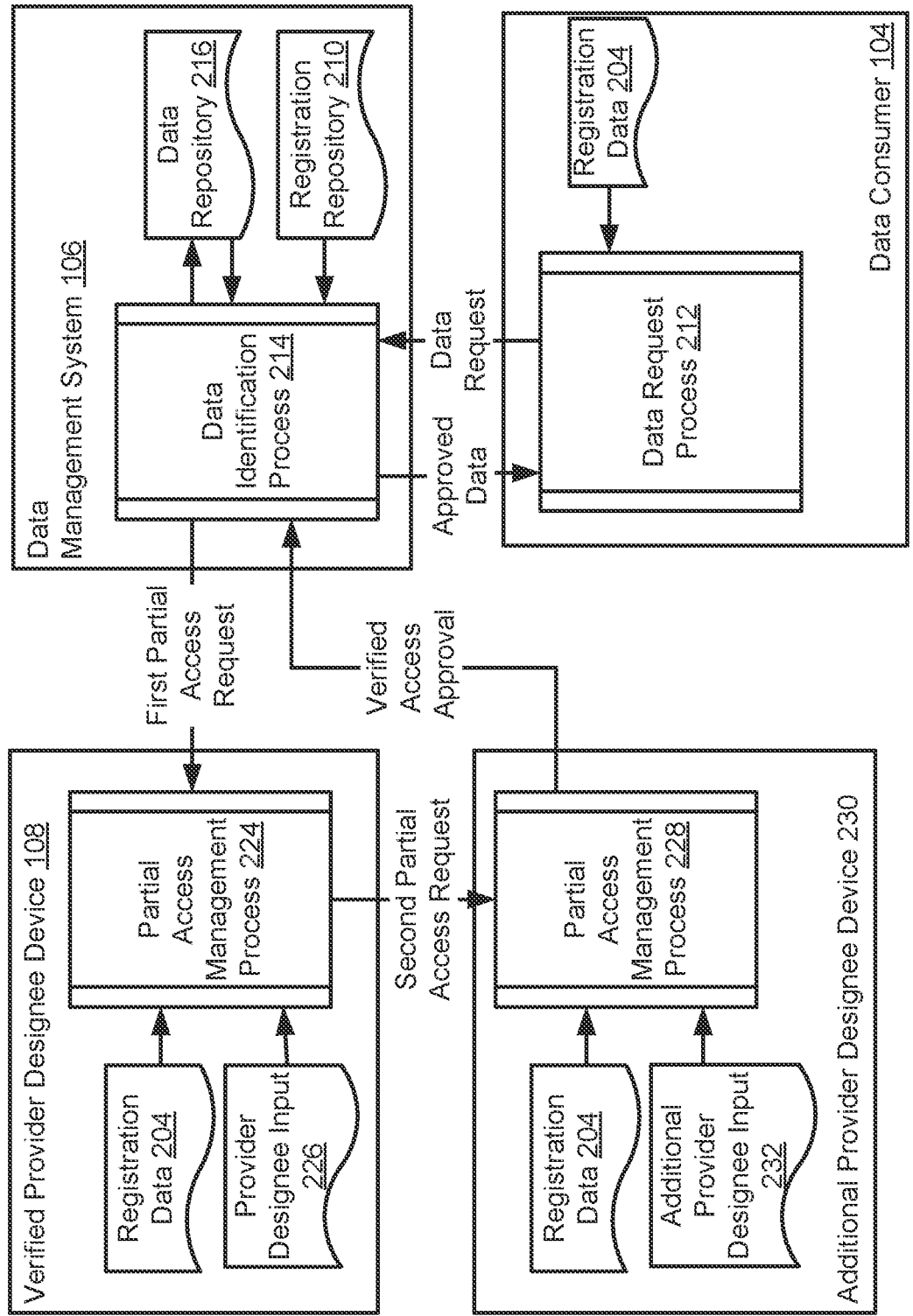

Verified provider designee device 108 may (i) receive access to (e.g., when granted access by other devices (e.g., 100, 102) and/or multiple devices) and control over data stored in data management system 106 when patient device 100 and verified designee device 102 are unable to grant access to the data, (ii) provide information identifying the capacity of the individual to manage access to the data stored in data management system 106, (iii) designation of additional devices (e.g., additional verified provider designee device) to assist in managing access control rights in the data stored in data management system 106 (e.g., when the patient and verified designee is likely unable to grant access to the data), and/or (iv) performance of other management operations. Verified provider designee device 108 may be registered with data management system 106. Refer to FIG. 2A for additional details regarding registration of verified provider designee device 108. Refer to FIG. 2D for additional details regarding managing control over data stored in data management system 106.

Verified provider designee device 108 and any additional verified provider designee devices may be implemented using, a personal electronic device, a desktop computer, and/or other types of devices that may be operated or used by a verified medical provider (e.g., a primary care physician) designated by the patient or by the verified medical provider.

Data consumer 104 may (i) submit requests for access to data stored in data management system 106 by a third party or other individual, (ii) provide information identifying the individual requesting access to the data and/or other types of information upon which decisions to grant access may be based, (iii) once a request for access is granted (e.g., by patient device 100, verified designee device 102, verified provider designee device 108, and/or other additional verified devices), and/or data consumer 104 may obtain access to data stored in the data management system 106 (e.g., data to which access has been granted based on the submitted requests). Data consumer 104 may submit requests for access to data stored in data management system 106. Refer to FIGS. 2B-2D for additional details regarding requesting access to data stored in data management system 106.

Data consumer 104 may be implemented by using, a personal electronic device, a desktop computer, and/or other types of devices that may be operated or used by a data consumer (e.g., an individual or third-party seeking access to the data).

Data management system 106 may be implemented with multiple computing devices. For example, data management system 106 may be implemented with a data center, cloud installation, or other type of computing environment. The computing environment may host a software stack for registering devices, and system for obtaining and managing privately held information.

Figure 3A:
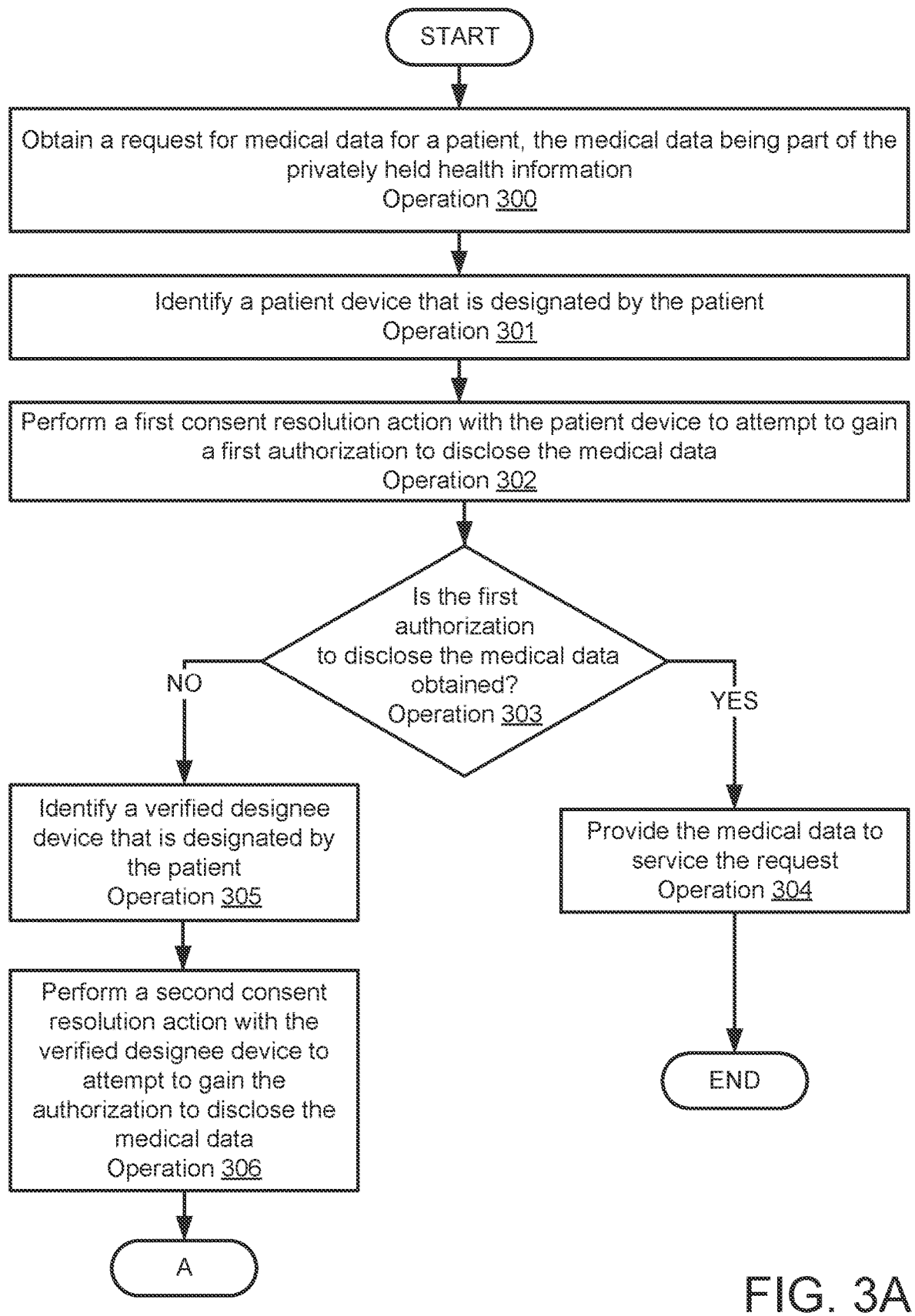
FIGS. 3A-3C show flow diagrams illustrating methods of managing access to data in accordance with an embodiment.
Figure 3B:
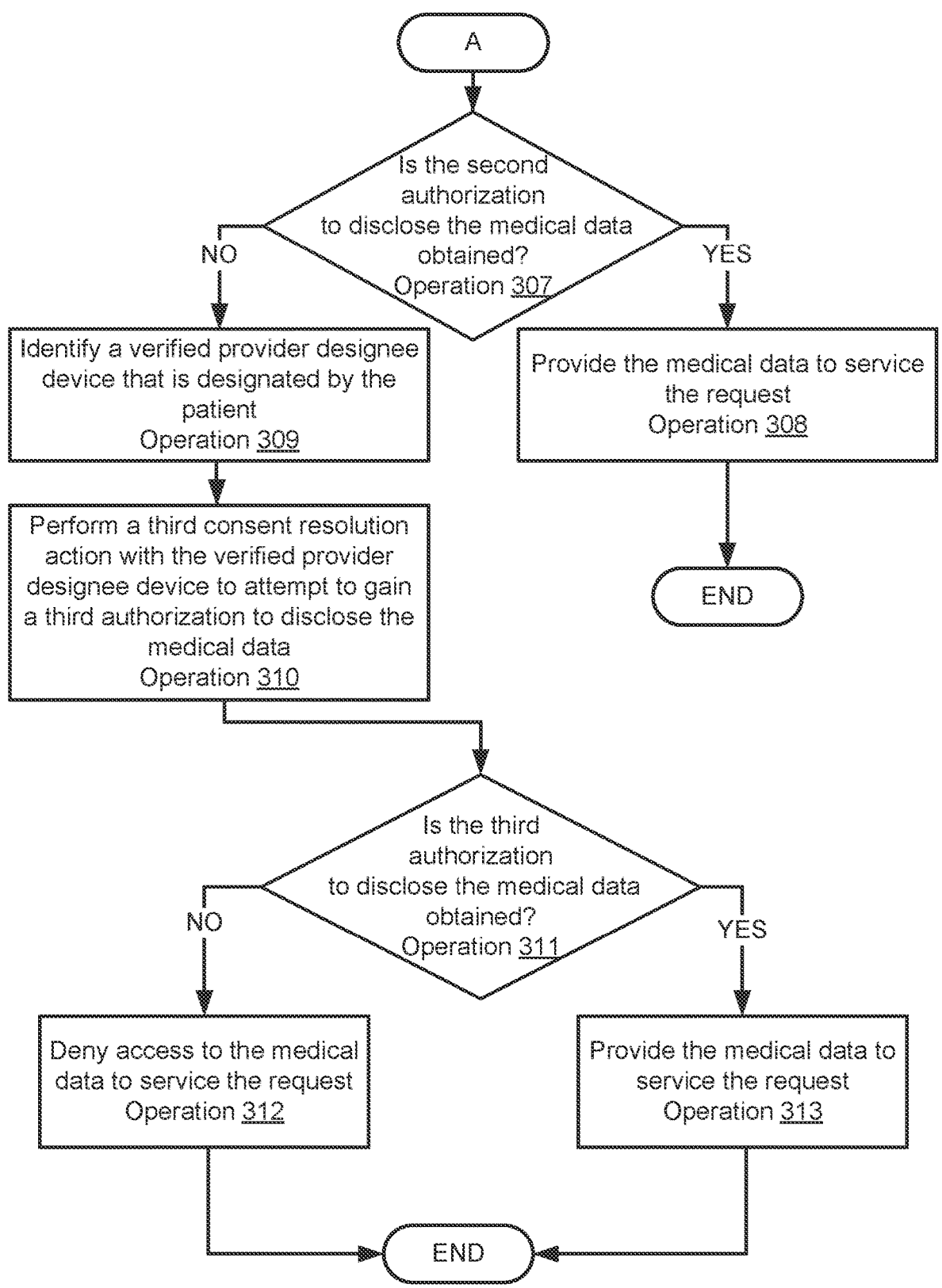
Figure 3C:
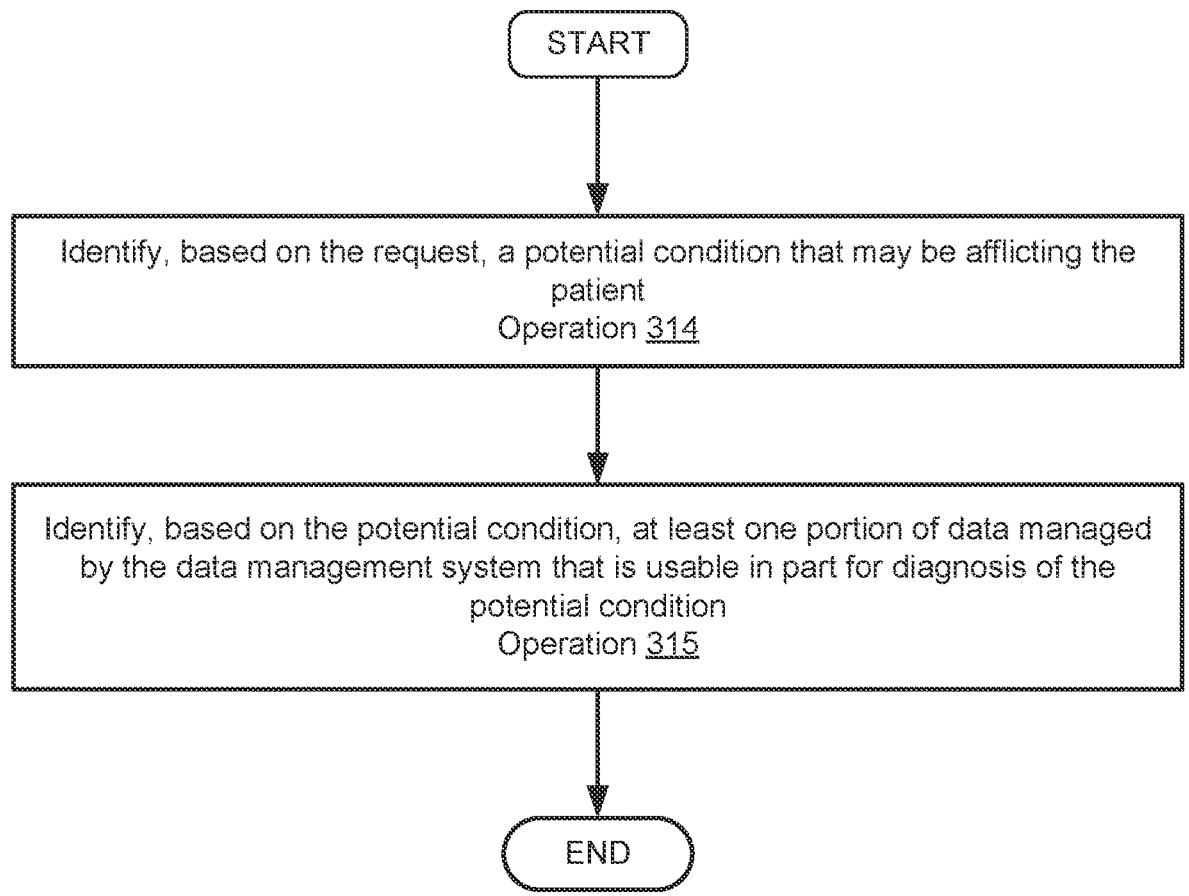

Patient device 100, verified designee device 102, consumer device 104, verified provider designee device 108, and/or data management system 106 may perform all, or a portion, of the methods shown in FIGS. 3A-3C.

Any of the components illustrated in FIG. 1 may be operably connected to each other (and/or components not illustrated) with communication system 110. In an embodiment, communication system 110 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, diagrams illustrating data flows implemented by a system over time in accordance with an embodiment are shown in FIGS. 2A-2D.

Turning to FIG. 2A, a first data flow diagram illustrating data flows, data processing, and/or other operations that may be performed by the system of FIG. 1 in accordance with an embodiment is shown. In FIG. 2A, example flows between patient device 100 and data management system 106 are shown. It will be appreciated that similar data flow with respect to any verified devices (e.g., verified designee device 102, data consumer 104, verified provider designee device 108, and/or any other additional verified designee devices) and data management system 106 may be present.

To limit risk of inadvertently disclosures of data, data management system 106 may require that particular devices associated with the individuals to which control over access to the data may be granted be registered with data management system 106 prior to allowing control and access to the data stored in data management system 106. To register with data management system 106, patient device 100 may perform registration process 200. During registration process 200, patient device 100 may send a registration request to device registration process 208 performed by data management system 106.

The registration request may include information regarding patient device 100. For example, the registration request may include identifying information such as a device identifier, device IP address, and/or other types of information regarding patient device 100. Additionally, the registration request may include information regarding the individual associated with the device. For example, patient device 100 may provide information regarding the patient (e.g., personal identification such as patient's name, date of birth, gender, and/or any other personal information identifying the patient).

Once obtained, device registration process 208 may use the information to (i) establish a registration for patient device 100 in registration repository 210, (ii) generate an identifier or metadata through which patient device 100 may be identified, and/or (iii) provide registration package to patient device 100 which may include the identifier or metadata generated by data management system 106 for patient device 100. The registration package may include a request for designation of particular devices associated with the individuals to which control over access to the data (all or a portion) stored in data management system 106. Based on the request, data management system 106 may grant the registration and/or may respond with requests for verification of individual operating patient device 100 (and/or any designed devices).

When registration package 204 is obtained by registration process 200, the identifier or metadata may be stored as registration data 204 by patient device 100 for future use. In addition, when obtained by the registration process 200, the request for designation of particular devices to assign control and access to the data may be initiated by patient device 100. The request for designation of particular devices may include a user to submit specific information regarding the individuals to which access to the data stored in data management system 106 may be granted. For example, the user may designate an individual by submitting the individuals' personal information (e.g., name, relation to the individual, etc.) including a form of electronic contact for the individual (e.g., cell phone number, email address, etc.).

Additionally, verification process 206 may be initiated by patient device 100. During verification process 206, any type of verifications (e.g., as specified in registration package) of patient device may be performed. The verifications may attempt to verify the identity of the individual operating patient device 100. The verifications may be performed by providing a prompt to an individual operating patient device 100. Operator feedback may also be obtained by patient device during verification (e.g., the individual operating patient device may submit response(s) to the prompt). The operator feedback obtained during verification may be included in an identity access package. The identity access package may include the (i) operator feedback, (ii) information for the designated individuals, (iii) and/or any other identifying information (e.g., identifier and/or metadata for patient device 100 included in registration data 204) which may be used to verify the identity of the individual operating patient device.

Once obtained by data management system 106, the identity access package may be used to update the information regarding patient device 100 included in registration repository 210. For example, registration repository 210 may be updated to (i) associate operator feedback to the prompts with the identifier and/or metadata for patient device 100, and/or (ii) identify additional devices designated by patient device 100.

Once updated, the information in registration repository 210 may be usable to (i) associate information indicating the capacity of each designated individual to grant access to the data stored in data management system 106.

Using the flow illustrated in FIG. 2A, any of the designated devices (e.g., verified designee device 102, verified provider designee device 108, and/or any additional designee devices) may be registered with data management system 106 to provide access to the data stored in data management system 106 in certain instances (e.g., when patient is likely unable to grant access to data).

Turning to FIG. 2B, a second data flow diagram illustrating data flows, data processing, and/or other operations that may be performed by the system of FIG. 1 in accordance with an embodiment is shown. In FIG. 2B, example flows between patient device 100, data management system 106, and data consumer 104 are shown.

After registration of patient device 100 is complete, data consumer 104 may perform data request process 212 through which access to data stored in data management system 106 from data consumer 104 may be requested. To initiate data request process 212, a data request may be provided to data management system 106. The data request may include a request for portions of data stored in data management system 106 for an individual. In addition, the data request may include registration data 204 associated with data consumer 104 thereby identifying the individual and/or entity providing the data request.

Once received by data management 106, the data request may initiate data identification process 214. Data identification process 214 may include (i) identifying, based on the data request, a potential condition that may be afflicting the patient, (ii) identifying, based on the potential condition, at least one portion of data stored in data management system 106 that is usable in part for diagnosis of the potential condition, and/or (iii) any other identification of data responsive to the data request. Data identification process 214 may include performing a look up using a type of the potential condition as a key to obtain an identifier for the at least one portion of the data. During data identification process 214, data as specified by data request may be identified using data repository 216.

Due to the sensitive nature of the data stored in data management system 106, an access request may be generated and sent to patient device 100 to verify that access to the requested data is to be granted. Thus, the access control framework may look for explicit confirmation for grants of access from the person most likely to be impacted should the requested data be inadvertently disclosed to an undesired recipient.

Data management system 106 may obtain identifications for individuals (e.g., associated devices) with access and control over the data stored in data management system 106 from registration repository 210. For example, data management system 106 may identify patient device 100 (e.g., identifier and/or metadata for patient device 100) from registration repository 210 and may provide an access request to patient device 100. The access request may include identified data responsive to data request as identified by data management system 106 and/or information regarding the identity of data consumer 104 (e.g., identifier and/or metadata for data consumer 104 from registration repository 210).

When the access request is obtained by patient device 100, access management process 218 may analyze the request to determine whether to provide access to identified data responsive to the request. The determination may be made by the individual or patient operating patient device 100 via patient input 220. For example, a graphical user interface may be presented to the user of patient device 100 to display information about the requested data, the requestor, and to allow the user to provide user input indicating how to respond to the request (e.g., agree or disagree, all or in part). Patient input 220 may include the patient or individual's response to the access request. For instance, the patient may agree or limit which portions of identified data responsive to the data request are to be accessed by data consumer 104. The resulting portions of identified data responsive to the data request may be indicated, identified, etc. in the access information provided to data management system 106.

The access information may specify whether the data consumer 104 is to be provided with access to, and the extent of the access (e.g., access may only be granted for a portion of requested data), the data responsive to the request and/or specify if the selected portions of the data responsive to the request as identified by data management system 106 is to be provided to data consumer 104. If the access to the selected data is authorized by patient device 100, then the selected data may be provided to data consumer 104. Otherwise, access to the selected data may be denied.

When the access information is obtained by data management system 106, an approved data package may be generated and provided to data consumer 104. The approved data package may include the data responsive to the request, portions of the data responsive to the request as permitted by patient device 100, and/or access to any other information as granted by patient device 100. Data consumer 104 may ingest the approved data package and store the selected data and/or information contained therein for use by data consumer 104.

As will be discussed with respect to FIG. 2C, if data management system 106 does not obtain a response to the access request from patient device 100, then data management system 106 may perform a second attempt for authorization to access the selected data.

Turning to FIG. 2C, a third data flow diagram illustrating data flows, data processing, and/or other operations that may be performed by the system of FIG. 1 in accordance with an embodiment is shown. In FIG. 2C, example flows between verified designee device 102, data management system 106, and data consumer 104 are shown.

As previously described above, data management system 106 may obtain information indicating the lack of capacity of the patient (via patient device 100) to grant access to the data. For example, data management system 106 may determine a patient is unable to grant access to requested data stored in data management system 106 when data management system 106 does not obtain a response to access request from patient device, for example, after a specific period of time has passed after the access request is sent to patient device 100.

As discussed above, when a data request from data consumer 104 is obtained by data management system 106, data management system 106 may obtain identification of individuals (e.g., associated devices) with access and control over the data stored in data management system 106 from registration repository 210. Data management system 106 may generate and send the access request to patient device 100 in a first attempt to verify that access to the requested data is to be granted. If data management system 106 does not obtain a response to the access request from patient device 100, data management system 106 may obtain identification of a secondary individual (e.g., associated device) with access and control over the data stored in data management system 106 from registration repository 210. For example, data management system 106 may identify verified designed device 102 (e.g., identifier and/or metadata for verified designee device 102) from registration repository 210 and may provide an access request to verified designee device 102. The access request may include identifiers for data responsive (and/or portions of the data or all of the data so that previews or other information regarding the data may be provided to a user of verified designee device 102) to data request as identified by data management system 106 and/or information regarding the identity of data consumer 104 (e.g., identifier and/or metadata for data consumer 104 from registration repository 210).

When the access request is obtained by verified designee device 102, access management process 218 may analyze the request to determine whether to provide access to identified data responsive to the request. The determination may be made by the individual operating verified designee device 102 via designee input 220. For example, a graphical user interface may be presented to the user of verified designee device 102 to display information about the requested data, the requestor, and to allow the user to provide user input indicating how to respond to the request (e.g., allow or deny, all or in part). Designee input 222 may include the response to the access request from the individual or user operating verified designee device 102. For example, the individual operating verified designee device 102 may agree or limit which portions of identified data responsive to the data request are to be access by data consumer 104. The remaining portions of the identified data responsive to the data request may be identified in the access information provided to data management system 106 from verified designee device 102.

Turning to FIG. 2D, a fourth data flow diagram illustrating data flows, data processing, and/or other operations that may be performed by the system of FIG. 1 in accordance with an embodiment is shown. In FIG. 2D, example flows between verified provider designee device 108, additional provider designee device 230, data management system 106, and data consumer 104 are shown.

As previously discussed above, data management system 106 may obtain more information indicating the lack of capacity of the patient (via patient device 100) and/or the designed individual (via verified designee device 102) to grant access to the data. Thus, data management system 106 may attempt a third authorization to verify that access to the requested data is to be granted.

In the third authorization attempt to verify access to data request obtained from data consumer 104, data management system 106 may obtain identification of a third individual (e.g., associated device) with access and control over the data stored in data management system 106 from registration repository 210. For example, data management system 106 may identify verified provider designee device 108 (e.g., identifier and/or metadata for verified provider designee device 108) from registration repository 210 and may provide a first partial access request to verified provider designee device 108. The first partial access request may include identifiers for data responsive (and/or portions of, as noted above) to data request as identified by data management system 106 and/or information regarding the identity of data consumer 104 (e.g., identifier and/or metadata for data consumer 104 from registration repository 210).

To provide further security for the data stored in data management system 106, verified provider designee device 108 may identify and designate an additional provider and/or associated device (e.g., additional provider designee device 230) to verify that access to data requested is to be granted. For example, verified provider designee device 108 may perform all process and/or methods as previously described above in FIG. 2A to register additional provider designee device 230 with data management system 106. Refer to FIG. 2A for additional details regarding registration of additional verified provider designee device 230.

When the first partial access request is obtained by verified provider designee device 108, partial access management process 224 may analyze the request to determine whether to provide first partial access to identified data responsive to the request. The determination may be made by the individual or user operating verified provider designee device 108 via provider designee input 226. For example, a graphical user interface may be presented to the user of verified provider designee device to display information about the requested data, the requestor, and to allow the user to provide user input indicating how to respond to the request (e.g., agree or disagree, all or in part). Provider designee input 226 may include the provider or individual's response to the first partial access request. For instance, the provider may agree or limit which portions of identified data responsive to the data request are to be access by data consumer 104. The resulting portions of identified data responsive to the data request may be indicated, identified, etc. in the second partial access request provided to additional provider designee device 230.

The second partial access request may specify whether verified provider designee device 108 is partially granting data consumer 104 access to the data requested, the extent of the access (e.g., access to portions of requested data granted by verified provider designee device 108), the data responsive to the data request and/or specify if the selected portions of the data responsive to the request (as determined by verified provider designee device 108) is to be provided to data consumer 104.

When the second partial access request is obtained by additional provider designee device 230, partial access management process 228 may analyze the second partial access request to determine whether to provide second partial access to identified data responsive to the request. The determination may be made by the additional provider or individual operating additional provider designee device 230 via additional provider designee input 232. For example, a user interface may be presented to the user of additional provider designee device 230 to display information about the requested data, the requestor, the response to the first partial access request from verified provider designee device 108, and to allow the user to provide user input indicating how to respond to the second partial access request (e.g., agree or disagree, all or in part). Additional provider designee input 232 may include the additional provider or individual's response to the second partial access request.

In the event that the first partial access to the selected data is authorized by verified provider designee device 108 and the second partial access to the selected data is authorized by additional provider designee device 230, then verified access approval may be provided to data management system 106. The verified access approval may specify the selected portions (e.g., identified by verified provider designee device 108 and/or additional provider designee device 230) of the data responsive to the request that are to be provided to data consumer 104.

When the verified access approval is obtained by data management system 106, an approved data package may be generated and provided to data consumer 104. The approved data package may include the portions of the data responsive to the request as permitted by verified provider designee device 108 and additional provider designee device 230.

In the event that the first partial access request to the selected data is not authorized by verified provider designee device 108, then access to the selected data may be denied. For example, data management system 106 may obtain a response to the first partial access request from verified provider designee device 108 indicating denial of access to the requested data. Data management system 106 may then generate and provide a message to data consumer 104 (e.g., the requestor) indicating that access to the requested data is denied. Additionally, if the first partial access request to the selected data is authorized by verified provider designed device 108 but the second partial access request to the selected data is not authorized by additional provider designee device 230, then access to the selected data may be denied.

As discussed above, the components of FIGS. 1-2D may perform various methods to manage operation of data processing systems. FIGS. 3A-3C illustrate methods that may be performed by the components of the system of FIGS. 1-2D. In the diagram discussed below and shown in FIGS. 3A-3C, any of the operations may be repeated, performed in different orders, omitted, and/or performed in parallel with or in a partially overlapping in time manner with other operations.

Turning to FIG. 3A, a flow diagram illustrating a method for managing control and access to data in accordance with an embodiment is shown. The method may be performed, for example, by any of patient device 100, verified designee device 102, data management system 106, verified provider designee device 108, data consumer 104, and/or other components of the system shown in FIGS. 1-2D.

Prior to operation 300, a data processing system may have obtained sensitive data for an individual and stored the sensitive data in a data repository within the data processing system. The sensitive data may have been obtained through various processes such as generation, acquisition from external entity (e.g., medical provider), acquisition from the individual whose sensitive data is being stored, and/or by any other method. The sensitive data may include data relating to healthcare information for an individual (e.g., medical records). The sensitive data may be categorized and processed by the data processing system based on potential conditions (e.g., health conditions such as asthma, diabetes, etc.). The data processing system may identify the sensitive data via the method illustrated in FIG. 3C. Refer to FIG. 3C for additional details regarding the method of identifying data (e.g., all or a portion of) managed by the data processing system.

At operation 300, a request for medical data (e.g., which may include or represent data regarding privately health information) for a patient may be obtained. The request may be obtained by (i) reading the request from storage, (ii) receiving the request via a communication, (iii) obtaining user input that defines the requests, and/or via other methods. For example, a data management system or another entity may manage a portal (e.g., a website) through which request for medical data may be submitted. The individual or entity may provide the request via the portal using a personal electronic device, and/or other type of data processing system.

The request may include (i) information regarding the requesting individual or entity, (ii) information regarding the requested data, and/or (iii) other types of information usable to request medical data for a patient.

At operation 301, a patient device (e.g., personal electronic device such as a cell phone, a tablet computer, etc.) that is designated by the patient may be identified. The patient device may be identified by obtaining an identifier or metadata for the patient device stored in a registration repository and/or any other method. Prior to operation 301, the patient device may be registered by the patient through a registration process with the data management system as discussed in FIG. 2A.

At operation 302, a first consent resolution action with the patient device to attempt to gain a first authorization to disclose the medical data may be performed. The first consent resolution action may include sending a first request for authorization to the patient device to grant access to medical data requested. The first request for authorization may include (i) an identifier for medical data responsive to the request as identified by the data management system, (ii) a prompt for user input to respond to the request, (iii) an identity of the individual or entity requesting the medical data and/or any other information necessary for authorization.

At operation 303, a determination is made regarding whether the first authorization to disclose the medical data is obtained. The determination may be based on (i) user input by the patient or individual operating the patient device to grant or deny (e.g., all or in part) access to the medical data requested and/or lack of user input after a specified period of time. For example, data management system may determine the first authorization to disclose the medical data is not obtained by not receiving a response to the first consent resolution action from the patient device after a period of time has passed.

If the first authorization to disclose the medical data is obtained (e.g., the determination is "Yes" at operation 303), then the method may proceed to operation 304. At operation 304, the medical data to service the request may be provided. The medical data (all or portions of data to which access has been granted) may be provided by (i) sending the medical data to the requesting individual or entity via communication by a data processing system, (ii) generating an access code for the requesting individual or entity in order to access the medical data via a portal (e.g., a website), (iii) and/or any other methods. Operation 304 may be performed by the data management system and/or the data consumer (e.g., the individual or entity requesting the medical data). The method may end following operation 304.

Returning to operation 303, if the first authorization to disclose the medical data is not obtained (e.g., the determination is "No" at operation 303), then the method may proceed to operation 305. At operation 305, a verified designee device that is designated by the patient may be identified. The verified designee device that is designated by the patient may be identified by obtaining an identifier or metadata for the verified designee device stored in a registration repository and/or any other method.

At operation 306, a second consent resolution action with the verified designee device to attempt to gain the authorization to disclose the medical data may be performed. The second consent resolution action may include sending a second request for authorization to the verified designee device to grant access to medical data requested. The second request for authorization may include (i) an identifier for medical data responsive to the request as identified by the data management system, (ii) a prompt for user input to respond to the request, (iii) an identity of the individual or entity requesting the medical data and/or any other information necessary for authorization.

The method may continue to operation 307 as discussed in FIG. 3B.

Turning to FIG. 3B, a flow diagram illustrating a method for managing control and access to data in accordance with an embodiment is shown. The method may be performed, for example, by any of patient device 100, verified designee device 102, data management system 106, verified provider designee device 108, data consumer 104, and/or other components of the system shown in FIGS. 1-2D.

Continuing the description of FIG. 3A, at operation 307, a determination is made regarding whether the second authorization to disclose the medical data is obtained. If the second authorization to disclose the medical data is obtained (e.g., the determination is "Yes" at operation 307), then the method may proceed to operation 308.

At operation 308, the medical data to service the request may be provided. The medical data to service the request may be provided by (i) sending the medical data (all or portions of data which access has been granted) to the requesting individual or entity via communication by a data processing system, (ii) generating and providing an access code to the requestor (e.g., individual or entity requesting the medical data) in order to access the medical data via a portal (e.g., a website), (iii) and/or any other methods. The method may end following operation 308.

Returning to operation 307, if the second authorization to disclose the medical data is not obtained (e.g., the determination is "No" at operation 307), then the method may proceed to operation 309. At operation 309, a verified provider designee device that is designated by the patient may be identified. The verified provider designee device that is designated by the patient may be identified by (i)

At operation 310, a third consent resolution action with the verified provider designee device to attempt to gain a third authorization to disclose the medical data may be performed. The third consent resolution action may include sending a third request for authorization to the verified provider designee device to grant access to medical data requested. The third request for authorization may include (i) an identifier for medical data responsive to the request as identified by the data management system, (ii) a prompt for user input to respond to the request (e.g., to grant or deny (all or in part) access to the medical data), (iii) an identity of the individual or entity requesting the medical data and/or any other information necessary for authorization.

In contrast to the first and second consent resolution actions, the third consent resolution action may require an additional provider designee device (e.g., designated by the verified provider designee device) to provide a response to the third authorization to disclose the medical data. By requesting a second response (via a second provider designee device) to the third consent resolution action prior to granting access to the medical data, the likelihood that the medical data may be unintentionally disclose may be reduced significantly.

At operation 311, a determination is made regarding whether the third authorization to disclose the medical data is obtained. If the third authorization to disclose the medical data is obtained (e.g., the determination is "Yes" at operation 311), then the method may proceed to operation 313.

At operation 313, the medical data to service the request may be provided. The medical data to service the request may be provided by (i) sending the medical data to the requesting individual or entity via communication by a data processing system, (ii) generating an access code for the requesting individual or entity in order to access the medical data via a portal (e.g., a website), (iii) and/or any other methods. The method may end following operation 313.

Returning to operation 311, if the third authorization to disclose the medical data is not obtained (e.g., the determination is "No" at operation 311), then the method may proceed to operation 312. At operation 312, access to the medical data to service the request may be denied. The method may end following operation 312.

Turning to FIG. 3C, a flow diagram illustrating a method of identifying data responsive to a request for medical data in accordance with an embodiment is shown. The method may be performed, for example, by any of patient device 100, verified designee device 102, data management system 106, verified provider designee device 108, data consumer 104, and/or other components of the system shown in FIGS. 1-2D.

At operation 314, a potential condition that may be afflicting the patient may be identified based on the request. The potential condition that may be afflicting the patient may be identified by (i) receiving information regarding a type of potential condition in the request, (ii) comparing the type of medical data in the request to the data stored, (iii) matching an identity or type of healthcare provider to the type of potential condition, and/or any other method. For example, the request for medical data may include information regarding the requestor's specialty or field of expertise (e.g., oncology, dermatology, etc.) to identify the potential condition afflicting the patient.

At operation 315, at least one portion of data managed by the data management system that is usable in part for diagnosis of the potential condition may be identified based on the potential condition. The at least one portion of data managed by the data management system that is usable in part for diagnosis of the potential condition may be identified by performing a look up or other type of parsing operation using a type of the potential condition as a key to obtain an identifier for the at least one portion of data, and/or any other method. The data managed by the data management system may be stored in a searchable format keyed to different types of potential conditions. For example, the data management system may associate a type of potential condition (e.g., asthma) with an identifier (e.g., respiratory related data) of the data stored in the data management system.

The method may end following operation 315.

Once the at least one portion of data managed by the data management system that is usable in part for diagnosis of the potential condition is identified, the at least one portion of data may be used to initiate access requests as described in FIGS. 2B-2D.

Using the methods illustrated in FIGS. 3A-3C, embodiments disclosed herein may facilitate access and control of sensitive data held on behalf of an individual. The access controls used to manage the sensitive data may enable access to the sensitive data while reducing the likelihood of inadvertent disclosures of the sensitive data.

Figure 4:
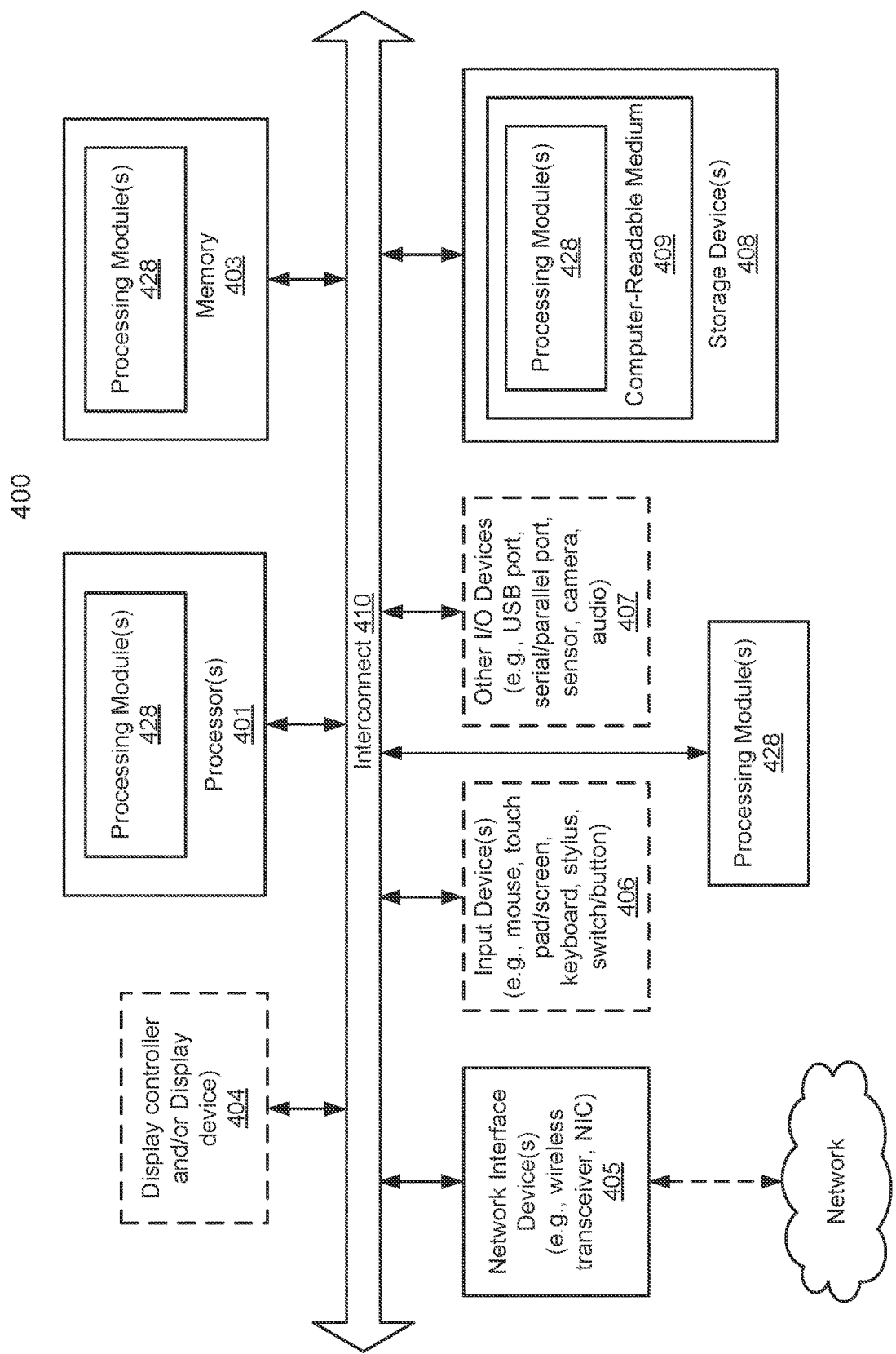
FIG. 4 shows a block diagram illustrating a data processing system in accordance with an embodiment.

Any of the components illustrated in FIGS. 1-2D may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing access to privately held health information, the method comprising:
   obtaining a request for medical data for a patient, the medical data being part of the privately held health information;
   in response to obtaining the request:
   identifying a patient device that is designated by the patient;
   performing a first consent resolution action with the patient device to attempt to gain a first authorization to disclose the medical data;
   in a first instance of the first consent resolution action where the first authorization to disclose the medical data was not obtained:
   identifying a verified designee device that is designated by the patient;
   performing a second consent resolution action with the verified designee device to attempt to gain a second authorization to disclose the medical data;
   in a first instance of the second consent resolution action where the second authorization to disclose the medical data was not obtained:
   identifying a verified provider designee device that is designated by the patient;
   performing a third consent resolution action with the verified provider designee device to attempt to gain a third authorization to disclose the medical data; and
   in a first instance of the third consent resolution action where the third authorization to disclose the medical data was not obtained:
   denying access to the medical data to service the request; and
   in a second instance of the third consent resolution action where the third authorization to disclose the medical data was obtained:
   providing the medical data to service the request.

2. The method of claim 1, wherein performing the third consent resolution action comprises:
   requesting the third authorization to disclose the medical data, the request being made to the verified provider designee device;
   obtaining a first response indicating whether the third authorization is partially granted by the verified provider designee device;
   in an instance of the first response where the third authorization is partially granted by the verified provider designee device:
   identifying a second provider designee device designated by the verified provider designee device;
   obtaining a second response indicating whether the third authorization is also partially granted by the second provider designee device; and
   determining whether the third authorization to disclose the medical data has been granted based on the first response and the second response.

3. The method of claim 2, wherein verified provider designee device is associated with a primary care physician for the patient, and the second provider designee device is associated with another professional that provides care to the patient.

4. The method of claim 3, wherein performing the first consent resolution action comprises:
   requesting the first authorization to disclose the medical data, the request being made to the patient device;
   obtaining a third response indicating whether the first authorization is granted by the patient device; and
   determining whether the first authorization to disclose the medical data has been granted based on the third response.

5. The method of claim 4, wherein performing the second consent resolution action comprises:
   requesting the second authorization to disclose the medical data, the request being made to the verified designee device;
   obtaining a fourth response indicating whether the second authorization is granted by the verified designee device; and
   determining whether the second authorization to disclose the medical data has been granted based on the fourth response.

6. The method of claim 5, further comprising:
   in a second instance of the first consent resolution action where the first authorization to disclose the medical data was obtained:
   providing the medical data to service the request.

7. The method of claim 6, further comprising:
   in a second instance of the second consent resolution action where the second authorization to disclose the medical data was obtained:

providing the medical data to service the request.

8. The method of claim 1, wherein the privately held health information is stored in a private data management system.

9. The method of claim 8, wherein the request for medical data is obtained from a data consumer system, the data consumer system providing data management services for a healthcare service provider that provides healthcare services for the patient, and the private data management system not being operated for the healthcare service provider.

10. The method of claim 9, further comprising:
identifying, based on the request, a potential condition that may be afflicting the patient; and
identifying, based on the potential condition, at least one portion of data managed by the data management system that is usable in part for diagnosis of the potential condition.

11. The method of claim 10, wherein identifying the at least one portion of the data comprises:
performing a look up using a type of the potential condition as a key to obtain an identifier for the at least one portion of the data,
wherein the data is stored in a searchable format keyed to different types of potential conditions.

12. A non-transitory machine-readable medium having instructions stored therein, which when executed by a processor, cause the processor to perform operations for managing access to privately held health information, the operations comprising:
obtaining a request for medical data for a patient, the medical data being part of the privately held health information;
in response to obtaining the request:
identifying a patient device that is designated by the patient;
performing a first consent resolution action with the patient device to attempt to gain a first authorization to disclose the medical data;
in a first instance of the first consent resolution action where the first authorization to disclose the medical data was not obtained:
identifying a verified designee device that is designated by the patient;
performing a second consent resolution action with the verified designee device to attempt to gain a second authorization to disclose the medical data;
in a first instance of the second consent resolution action where the second authorization to disclose the medical data was not obtained:
identifying a verified provider designee device that is designated by the patient;
performing a third consent resolution action with the verified provider designee device to attempt to gain a third authorization to disclose the medical data; and
in a first instance of the third consent resolution action where the third authorization to disclose the medical data was not obtained:
denying access to the medical data to service the request; and
in a second instance of the third consent resolution action where the third authorization to disclose the medical data was obtained:
providing the medical data to service the request.

13. The non-transitory machine-readable medium of claim 12, wherein performing the third consent resolution action comprises:
requesting the third authorization to disclose the medical data, the request being made to the verified provider designee device;
obtaining a first response indicating whether the third authorization is partially granted by the verified provider designee device;
in an instance of the first response where the third authorization is partially granted by the verified provider designee device:
identifying a second provider designee device designated by the verified provider designee device;
obtaining a second response indicating whether the third authorization is also partially granted by the second provider designee device; and
determining whether the third authorization to disclose the medical data has been granted based on the first response and the second response.

14. The non-transitory machine-readable medium of claim 13, wherein verified provider designee device is associated with a primary care physician for the patient, and the second provider designee device is associated with another professional that provides care to the patient.

15. The non-transitory machine-readable medium of claim 14, wherein performing the first consent resolution action comprises:
requesting the first authorization to disclose the medical data, the request being made to the patient device;
obtaining a third response indicating whether the first authorization is granted by the patient device; and
determining whether the first authorization to disclose the medical data has been granted based on the third response.

16. The non-transitory machine-readable medium of claim 12, wherein the operations further comprise:
identifying, based on the request, a potential condition that may be afflicting the patient; and
identifying, based on the potential condition, at least one portion of data managed by a data management system that is usable in part for diagnosis of the potential condition.

17. A data processing system, comprising:
a processor; and
a memory coupled to the processor to store instructions, which when executed by the processor, cause the processor to perform operations for managing access to privately held health information, the operations comprising:
obtaining a request for medical data for a patient, the medical data being part of the privately held health information;
in response to obtaining the request:
identifying a patient device that is designated by the patient;
performing a first consent resolution action with the patient device to attempt to gain a first authorization to disclose the medical data;
in a first instance of the first consent resolution action where the first authorization to disclose the medical data was not obtained:
identifying a verified designee device that is designated by the patient;

performing a second consent resolution action with the verified designee device to attempt to gain a second authorization to disclose the medical data;

in a first instance of the second consent resolution action where the second authorization to disclose the medical data was not obtained:

identifying a verified provider designee device that is designated by the patient;

performing a third consent resolution action with the verified provider designee device to attempt to gain a third authorization to disclose the medical data; and in a first instance of the third consent resolution action where the third authorization to disclose the medical data was not obtained:

denying access to the medical data to service the request; and in a second instance of the third consent resolution action where the third authorization to disclose the medical data was obtained:

providing the medical data to service the request.

18. The data processing system of claim 17, wherein performing the third consent resolution action comprises:

requesting the third authorization to disclose the medical data, the request being made to the verified provider designee device;

obtaining a first response indicating whether the third authorization is partially granted by the verified provider designee device;

in an instance of the first response where the third authorization is partially granted by the verified provider designee device:

identifying a second provider designee device designated by the verified provider designee device;

obtaining a second response indicating whether the third authorization is also partially granted by the second provider designee device; and determining whether the third authorization to disclose the medical data has been granted based on the first response and the second response.

19. The data processing system of claim 18, wherein verified provider designee device is associated with a primary care physician for the patient, and the second provider designee device is associated with another professional that provides care to the patient.

20. The data processing system of claim 19, performing the first consent resolution action comprises:

requesting the first authorization to disclose the medical data, the request being made to the patient device;

obtaining a third response indicating whether the first authorization is granted by the patient device; and determining whether the first authorization to disclose the medical data has been granted based on the third response.

* * * * *